Oct. 9, 1928. 1,687,409

R. WEBER

FASTENING DEVICE TO BE APPLIED TO ROPES, CABLES, AND CHAINS

Filed Aug. 16, 1926

Reinhold Weber
INVENTOR.

BY
ATTORNEYS.

Patented Oct. 9, 1928.

1,687,409

UNITED STATES PATENT OFFICE.

REINHOLD WEBER, OF SAN TOY, OHIO, ASSIGNOR OF ONE-HALF TO FRANK A. RAY, OF COLUMBUS, OHIO.

FASTENING DEVICE TO BE APPLIED TO ROPES, CABLES, AND CHAINS.

Application filed August 16, 1926. Serial No. 129,357.

My invention relates to a fastening device to be applied to ropes, cables and chains. Any one who has tried to tie a stiff, unwieldly rope to an object knows that it is a difficult and time-consuming feat. Then, one must be very careful that the rope is tied in such a manner that it will not become unfastened.

An important object of my invention is the provision of a device so arranged and constructed that it may be quickly and almost instantaneously used to effect a fastening of ropes, cables and chains without the use of knots.

One object of my invention is the provision of a device for fastening ropes, cables and chains to objects, so designed that it will not become accidentally unfastened and that does not rely upon tension to keep it securely fastened to the object to which the rope, cable or chain may be attached.

Another object of my invention is the provision of a device as a fastening means for ropes, cables and chains which is very simple in construction, costs very little to manufacture and which is very convenient and efficient in operation.

A further object of my invention is the provision of a device for fastening the ends of ropes, cables, chains and the like whereby the rope, cable or chain may be readily attached to or detached from an object without the inconvenience of tying or untying knots, thereby saving the time usually consumed in such operations.

A still further object of my invention is the provision of a means to be attached to the ends of ropes, cables or chains which is so devised that, by the use thereof, a slip noose may be made almost instantaneously in a rope, cable or chain.

Additional objects, advantages and features of my invention will appear in the following description of the drawings wherein similar characters of reference designate corresponding parts and wherein Figure 1 shows a perspective view of my device attached to a rope by its terminal eye.

In its preferred form, my invention consists of a pig tail, made of a heavy, round rod having a terminal eye 1. Integral with and extending from the terminal eye 1 is a shank portion 2. This shank portion 2 is curved at its opposite end to form the spiral portions 3 and 4. The spiral portion 4 terminates as at 5.

Figure 1:
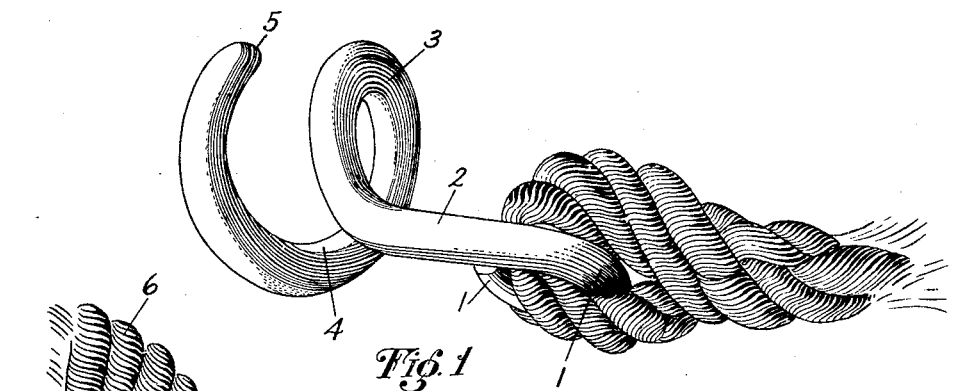
Figure 2:
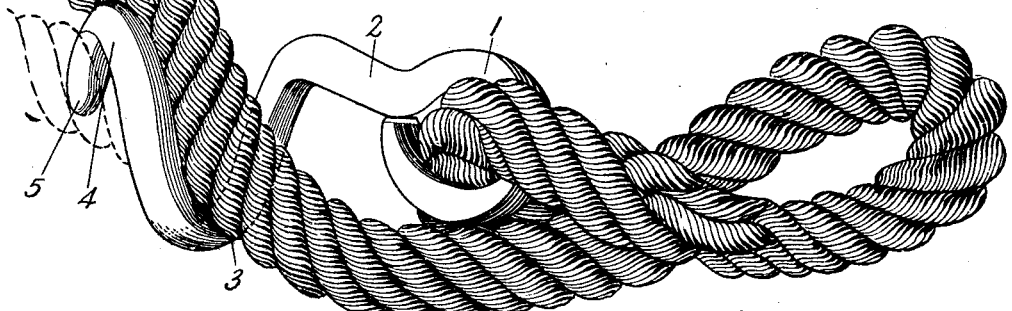
Figure 2 shows a perspective view of my fastening device attached to the end of a rope and the initial manner in which the rope is placed within the spiral coils of my device in order to form a noose of the rope.
Figure 3:
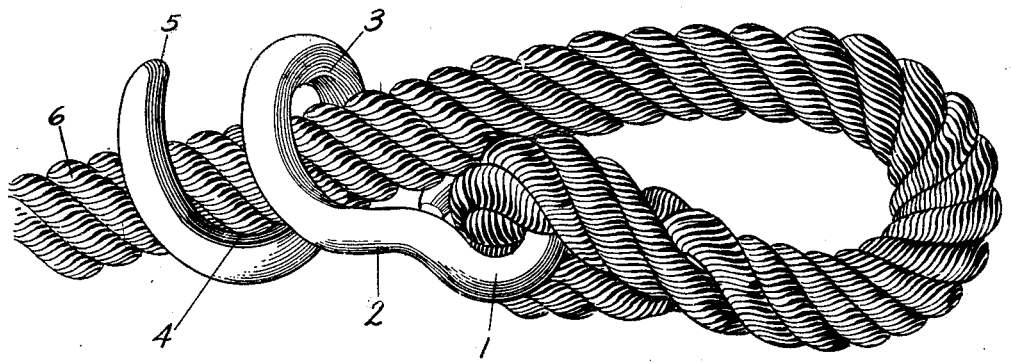
Figure 3 shows a perspective view of my device attached to the end of a rope with the intermediate part of the rope embraced within the spirals to form a secure fastening means and allowing the rope to be used as a slip noose.

In the use of my device, one end of a rope, cable or chain is permanently attached to the terminal eye 1 by means of clips, splicing, knotting or in any other well known manner. When it is desired to fasten a rope with my device thereon to an object, the rope is wound about the object one or more times, as may be desired, and the end of the rope having my device thereon may then be quickly connected to the intermediate portion of the rope forming a loop about the object, by merely entwining the intermediate portion of the rope within the spirals 3 and 4 of my device. One simple and quick way of doing this is shown in Figure 2. The rope is slipped into the open portion of the spiral 3, shown in Figure 2, and resting upon the closed part of the said spiral portion 3. The rope, being in the position shown in Figure 4, is then bent around the point 5 of spiral 4 and thus becomes completely embraced by the spirals 3 and 4, as shown in the dotted lines in Figure 2 and as more clearly shown in Figure 3. In this position, the rope is held securely and will not become unfastened because the rope is completely encircled by spirals 3 and 4, which form a complete ring about the rope, as shown in Figure 3. To detach, the rope must be bent around the point 5 of spiral 4 in the reverse direction to the direction in which it was attached so that the portion of the rope within the spirals is substantially horizontal to the plane of the spirals 3 and 4, as viewed from the open part of spiral 3, shown in Figure 2. The rope is then free and may be lifted out of the open spiral portion 3.

The operations above described of attaching and detaching my device to and from the intermediate portion of the rope 6 are very quickly performed by a simple twist of the rope, probably not taking more than a second or two or, it may be, less time, depending upon the quickness and skill of the person using the device.

It will be understood, of course, that I have described only one manner in which this device may be attached to or detached from the intermediate portion of the rope. Other ways of doing this will be obvious, as by placing the intermediate portion of the rope within the open part of spiral 4 first, the rope resting upon that part of the spiral opposite to the open portion. The rope is then bent around the closed part of spiral 3 until it comes to the open part of spiral 3 when it is then completely encircled by both spirals. Detaching may be accomplished by reversing this action. Other ways of entwining the rope within the spirals 3 and 4 may be accomplished in actual use. Once the intermediate portion of the rope is entwined within the spirals of my device, the rope may be drawn taut as the rope slips freely within the spirals so that it may be used as a slip noose.

When a tow line is desired, one of my devices may be attached to each end of a rope. However, when the rope is used for hoisting material and the like, when the other end of the rope is anchored or fastened about a pulley, it is only necessary to use one of my devices.

It will thus be seen that I have provided a means to be used for fastening ropes, cables or chains to an object without having to use knots, thus saving the time and eliminating the inconvenience of the old method of fastening ropes to objects by tying knots in the rope so as to make it secure to the object.

My device has the advantage of being very simple to operate and has the additional advantage of being a great time saver in that it may be quickly attached or detached, thus making it a very convenient means where a rope has to be constantly and frequently attached or detached by a workman in hoisting objects with cranes, et cetera, and where the operation must be repeated hundreds of times in the course of a day's work. This device may be manufactured for use with any size rope, cable or chain. Once tied, it will not become unfastened of itself and does not rely upon tension to hold it in fastened position, as some of the devices do which are now in use.

My device is useful and convenient for many purposes. It may be attached to ropes used as tow lines for motor vehicles, boats, dragging hay from meadows or barns, et cetera. It may be used on drag lines with skips, buckets, or scrapers. It may be used on derrick lines for hoisting materials. It has many uses about a farm. For instance, it may be used for dragging logs. It may be used to form a slip noose for securing sacks of grain or bales of hay to be hoisted or lowered from a grain or barn loft. It may be used on ropes, cables or chains for moving machinery or raising smoke stacks. It may also be used as terminal fastenings, on guy ropes, tent ropes, or for any other purpose for which ropes, cables or chains are or may be used.

Having thus described my invention, what I claim is:

A fastening device for ropes, cables, or chains comprising an eye construction with a straight shank leading therefrom and forming an integral part thereof, a lateral curved portion forming an integral part of said shank, said curved portion being bent in the form of a spiral continuing more than one complete revolution, the free end portion of the spiral being suitably spaced from the first part of the spiral so as to receive the rope.

In testimony whereof, I hereby affix my signature.

REINHOLD WEBER.